June 14, 1966 W. S. MILLER 3,256,385

TELEVISION SCANNING SYSTEM FOR THE PROJECTION OF COLORED IMAGES

Filed Aug. 3, 1962

WENDELL S. MILLER
INVENTOR.

BY William P. Green
ATTORNEY 3,256,385
United States Patent Office
Patented June 14, 1966

3,256,385

TELEVISION SCANNING SYSTEM FOR THE PROJECTION OF COLORED IMAGES

Wendell S. Miller, 1341 Comstock Ave., Los Angeles, Calif.

Filed Aug. 3, 1962, Ser. No. 214,550
1 Claim. (Cl. 178—5.4)

This invention relates to an improved scanning system for a television receiver, the system being in certain respects especially advantageous for use in a color television set.

As is well known, conventional color television receivers have the decided disadvantage of being extremely critical in operation, and requiring the maintenance of very precise dimensional tolerances in the manufacture of the picture tube. At the location of each spot on the produced image, there must be provided three individual differently colored phosphor spots, with different electron guns being aimed at these three spots respectively, through three precisely located aperatures in a mask located behind the viewing screen. In order for the receiver to function properly, the three guns must scan very rapidly across the face of the picture tube while at the same time being so aimed as to accurately hit the appropirate phosphor spots at each of the multitude of different image points on the face of the tube. Obviously, it is very easy for a picture tube of this type to become slightly out of adjustment, with the result that the three colors may be improperly mixed.

A major object of the present invention is to provide a new type of scanning system which is useable for color television, and which is so designed as to eliminate the above discussed criticalities from the reception of a color picture. As will appear, a receiver embodying the invention does not require the aiming of three electron guns through closely spaced apertures in a color mask, or onto three closely spaced phosphor spots. Instead, the different guns for the three colors to be mixed may be directed against much larger areas of fluorescent or phosphorescent material, with the resulting differently colored illuminated areas being similarly spaced relatively far apart. To form these spaced fluorescently illuminated areas into a properly viewable picture, the three colors from these different areas are subsequently mixed together in a manner such that the proper color components for particular points on the viewed image are superimposed on one another in proper relation across the entire face of the image. Besides these discussed advantages, a system embodying the invention has the further very desirable feature of allowing the use of a color tube which is actually much smaller than conventional tubes and which may be considerably smaller in one direction than the ultimate image formed.

Further, it is contemplated that this advantage and perhaps other features of the invention may render the system desirable for use in some mono-color television receivers, though this application will discuss primarily the use of the apparatus in color sets.

To attain the mentioned advantages, I may employ a scanning system in which a first scanning operation is performed electronically, within a cathode ray tube or tubes, or other similar tube having a selt luminous screen, with a second and supplementary scanning function then being accomplished on the electronically produced image by an optical scanning system. More particularly, the cathode ray tube may produce a succession of differently illuminated lines, corresponding to different lines in a television picture, and the optical system may then receive the information from these illuminated lines and scan across a viewing screen in a manner properly locating the lines in appropriately spaced relation to form the ultimate image. The cathode ray tube or tubes may form three such lines, of three different colors, and the optical system may mix these three lines together for superimposition one upon the other on the ultimate viewing screen. The actual optical scanning may be attained by appropriately moving a mirror by which the light is reflected onto the screen, with the mirror desirably being mounted to rotate about a predetermined axis in timed relation to the operation of the electron beam or beams in the cathode ray tube. In one form of the invention, the different colors are mixed together by means of a tapering light guide element, while in another form of the invention, the mixing of the different colors is attained by introducing predetermined different delays into the input signals fed to the different color guns.

The above and other features and objects of the present invention will be better understood from the following detailed description of the typical embodiments illustrated in the accompanying drawing, in which.

Figures 1, 3:
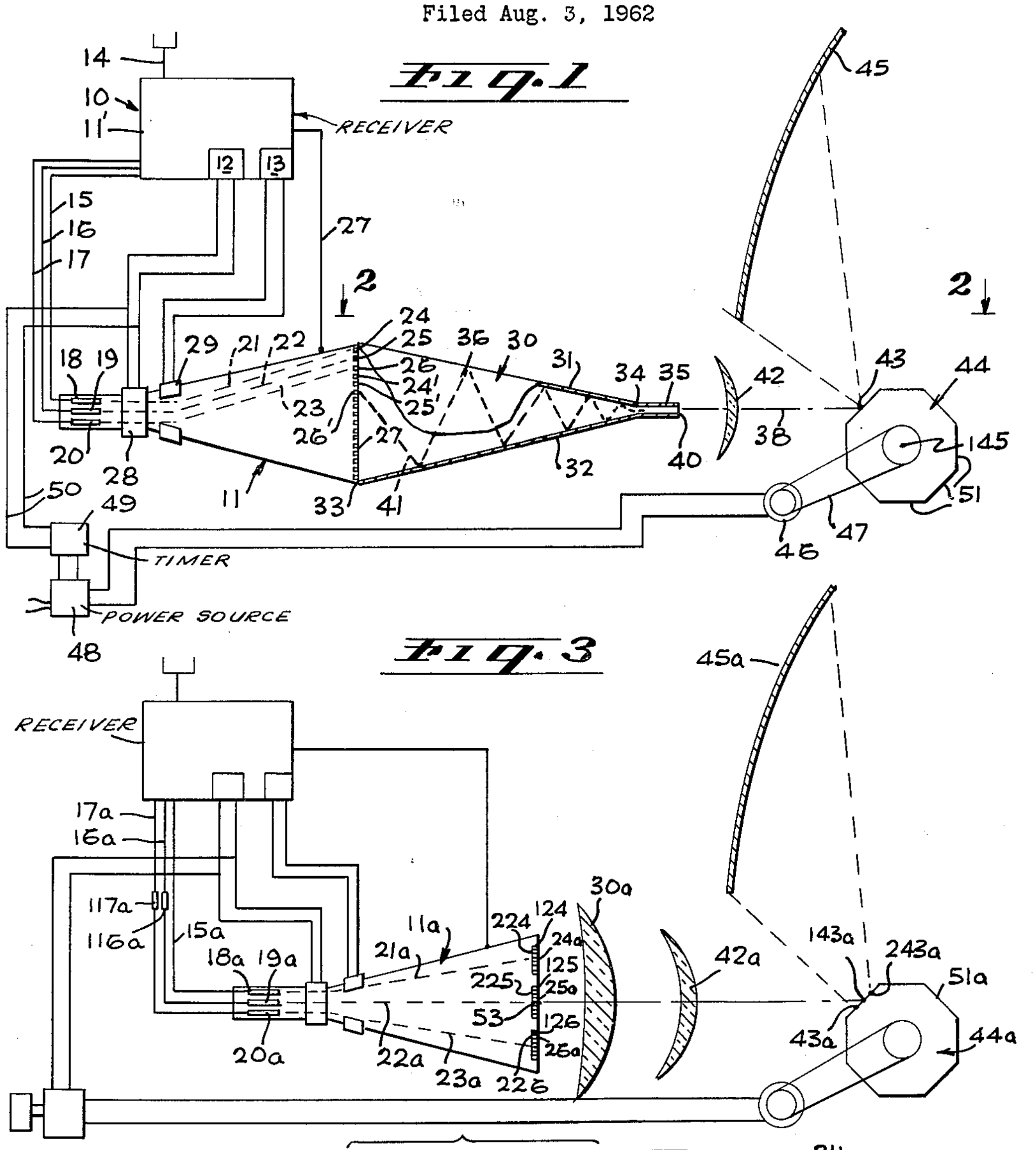
FIG. 1 is a side view, partially in section, of a first form of color television receiver system embodying the invention.
FIGS. 3 and 4 are views similar to FIG. 1, but showing two variational forms of the invention.

Referring first to FIG. 1, I have represented generally at 10 a color television receiver which may be identical with conventional receivers operating on the NTSC system, except with regard to the construction and operation of picture tube 11' and the optical scanning apparatus associated with that tube. The conventional circuitry of receiver 10 is represented generally at 11, and includes the usual horizontal deflection signal generator 12 and vertical deflection signal generator 13. The picture information is received by circuit 11 through antenna 14, with circuit 11 functioning in conventional manner to form three separate color signals varying in intensity in correspondence with the variations in the amount of red, blue and yellow light respectively required to form the ultimate image to be viewed. These three color signals are fed through leads 15, 16 and 17 respectively to three electron guns 18, 19 and 20 in cathode ray tube 11. Guns 18, 19 and 20 aim individual electron beams 21, 22 and 23 toward phosphor strips 24, 25, 26, 24', 25', 26' etc. formed at the inner side of a front glass wall 27 of tube 11. The anode is formed in the picture end of tube 11 in the usual manner, and is supplied with a high positive potential from circuitry 11 through anode lead 27.

Beams 21, 22 and 23 are caused to scan horizontally along phosphor lines 24, 25, 26, etc., in appropriately timed relation to the picture information on leads 15, 16 and 17, to cause the guns to form complete lines of the picture on the phosphors. That is, each time that the picture information fed to guns 18, 19 and 20 represents the beginning of a line of the image, beams 21, 22 and 23 correspondingly commence a line on the phosphors, and each time that the information fed to the guns represents the end of the line, the beams 21, 22 and 23 correspondingly complete their lines and retrace horizontally during a blacked out period to commence the next successive line. This horizontal deflection of the beams is thus exactly the same as in conventional television sets, and is effected by the usual horizontal deflection coils 28, which receive their deflection signals from the signal generator 12.

It is contemplated that, if desired, the electron beams 21, 22 and 23 need not be deflected vertically at all, but instead may each retrace successive lines at exactly the same point on their respective phosphors. For instance, the elctron beam 21 may always remain in the same horizontal plane illustrated in FIG. 1, to form all of its lines at exactly the same level on the same horizontally elongated single phosphor strip 24. In the same manner, electron beam 2 may if desired always be directed against the single phosphor strip 25, and beam 23 may always be directed against and form illuminated lines on the single phosphor strip 26. However, though it is possible to utilize a single phoshpor strip in this manner for each electron beam 22 may if desired always be directed against the phosphor strips in order to avoid burning out or damaging the phosphors by excessive use. For this purpose, there may be formed beneath strips 24, 25 and 26 a second set of similar and similarly spaced strips 24', 25' and 26', with other corresponding sets of phosphor strips being provided below this second set. Thus, the beams 21, 22 and 23 may first scan across top strips 24, 25 and 26 respectively, and then be deflected downwardly to form the next line of the picture on strips 24', and 25' and 26', respectively, then being deflected downwardly for the next line, etc.

The vertical deflection of the beams 21, 22 and 23 may be produced in conventional manner by ordinary vertical deflection coils 29, receiving signals from a vertical deflection signal generator 13 which may be conventional except that it need not form as many different lines on the face of tube 11 as there are in the picture being formed. For example, the picture may contain five hundred fifty lines, while the number of sets of phosphors 24, 25, 26, etc., may be a much smaller number, say for example seven or eight such sets, so that coils 29 cause the beams 21, 22 and 23 to retrace vertically after seven or eight lines, or to merely scan downwardly across the face of the tube, and then return upwardly, then scan downwardly again, etc.

The three phosphor strips 24, 25 and 26, and their counterparts in the other sets of strips, act when energized by the electron beams to form the colors red, blue and yellow respectively, assuming that these are the three colors with which the signals fed to the corresponding electron guns are associated. The various phosphor strips may be of sufficient extent vertically to avoid the necessity for any extreme precision in properly aiming the electron beams to hit the appropriate strips. For this reason, each individual strip may if desired have a vertical extent considerably greater than the normal vertical width of the illuminated line produced on that strip by the electron beam.

The lighted lines produced on the phosphor strips 24, 25, 26 etc. are mixed together beyond tube 11 to form a single line of mixed color. This result is achieved by the provision of a tapering element 30 opposite the illuminated face 27 of tube 11. This element 30 may have upper and lower walls 31 and 32 which converge from their light inlet ends 33 to a location 34 at which the vertical spacing between walls 31 and 32 is desirably very small, so that only a very thin line of light can emit from member 30 beyond the points 34. To further assure such confinement of the light, top and bottom walls 31 and 32 of member 30 may have parallel portions 35 beyond the location 34, in very closely spaced relation.

As seen in plan view (FIG. 2), member 30 and its top and bottom walls 31 and 32 may flare progressively between points 33 and 40, with the opposite sides of member 30 being closed by two diverging vertical walls 36 and 37. As will be apparent from a consideration of FIG. 2, the horizontal width of member 30 at its light inlet end 33 may correspond approximately to the width of the illuminated end wall 27 of picture tube 11. This end wall 27 may be rectangular, being of the width 39 (FIG. 2) along its entire vertical height, with the strips 24, 25, 26, etc. all extending substantially entirely across the width 39 of face 27.

The undersurface of wall 31 and the upper surface of wall 32 are rendered highly specularly reflective, across their entire areas, as by the provision of an aluminized or silvered reflective surface on these parts. These reflective surfaces may continue through the parallel portions of walls 31 and 32. The inner surfaces of vertical walls 36 and 37, on the other hand, are desirably non-reflective, and coated with a black substance capable of absorbing substantially all light falling on the surfaces. As a result of the reflective characteristic of walls 31 and 32, member 30 functions as a light collector, concentrator and mixer, and substantially all light emitting from the phosphor strips 24, 25, 26, etc. is reflected by walls 31 and 32, sometimes through several successive reflections, in a manner causing that light to be concentrated as it moves to the right in FIG. 1, through member 30, so that by the time the light from the various phosphor strips reaches the narrow slit at discharge end 40 of member 30, the light is in the form of a narrow line in which the three colors from the three phosphor strips (24, 25 and 26 or any other set of phosphor strips) are mixed together or superimposed one on the other in proper relation for forming one fully colored line of the ultimate picture. To illustrate the manner in which light from the phosphors reflects toward outlet 40, I have illustrated in FIG. 1 one ray of light 41 which first travels downwardly to impinge against and be reflected by wall 32, then bounces upwardly to reflect against wall 31, and continues this reflection course until it ultimately reaches outlet 40. In a similar manner, the member 30 acts to pick up and transmit to outlet 40, in mixed form, most of the light from all of the different phosphor strips.

The image of the line produced at outlet 40 is obviously a highly astigmatic image. In particular, the vertical focus of that image is at the location 40, while the horizontal focus of the image is in the plane of phosphor strips 24, 25, 26, etc. At a location beyond member 30 I desirably provide a cylindrical lens 42, desirably of uniform cross-section across its entire width 43' (FIG. 2), and constructed to move the vertical focus of the light emitting from outlet 40 to a line 43. This line is then optically scanned by a mirror unit 44 onto a viewing screen represented diagrammatically at 45. The lens 42 is wider than discharge end 40 of member 30, and each of the successive light handling elements 44 and 45 is wider than the preceding element to allow viewing of the ultimate image from points offset laterally from the main axis 38 of the apparatus. Screen 45 is specularly reflective, and is curved, in a manner acting to overcome the astigmatic character of the system, and bring the vertical and horizontal foci into coincidence, to produce a viewable image. That image is of course a virtual image which appears to be located behind the screen.

Unit 44 is mounted to rotate about an axis 145 which is disposed transversely of and located somewhat beneath the previously mentioned central axis 38 of member 30 and tube 11. Also, axis 145 is parallel to the slit 40 at the outlet end of member 30, as well as to the phosphors 24, 25, 26, the lines formed on those phosphors, the axis about which lens 42 is curved, and the line 43. Member 44 is driven about axis 145 by a motor 46, through a timing chain or other timed drive represented at 47. Power is fed to motor 46 (which may be a synchronous motor) from a power source 48, under the control of a timer 49, which is in turn controlled by a signal taken through leads 50 from the horizontal deflection generator 12.

Thus, member 44 turns in timed relation to the horizontal scanning movement of electron beams 21, 22 and 23.

Unit 44 carries several (typically eight) specularly reflective mirrors 51, which face directly radially outwardly from axis 145 at evenly circularly spaced locations. Where eight such mirrors are provided each may extend through exactly 45°, so that the mirror structure is of octagonal cross-section. Where a different number of mirrors are employed, the structure may be of a similar regular polygonal cross-section, but having a different number of sides than eight. In the illustrated arrangement of FIG. 1, the octagonal cross-section of the eight sided mirror assembly is uniform across the entire length of that assembly, that is across a dimension corresponding to the width designated 39' in FIG. 2. The vertical focus line 43 produced by lens 42 is positioned to lie approximately on, or very near to, the mirror surfaces 51 of assembly 44, though because of the non-circular shape of those surfaces line 43 obviously can not at all times lie exactly on mirror surfaces 51. The rate of rotation of unit 44 is such that the interval required to move one of the mirror faces 51 past line 43 (or past any other particular selected point) is exactly equal to the interval between the commencement of the formation of one picture by guns 18, 19 and 20, and the commencement of the next successive picture or frame by those guns.

Figure 2:
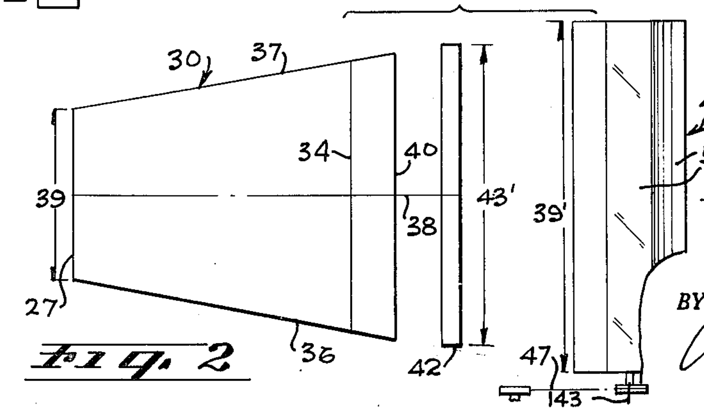
FIG. 2 is a plan view taken on line 2—2 of FIG. 1.

To now describe the full cycle of operation of the device of FIGS. 1 and 2, assume that tube 11 is functioning, and that unit 44 is turning in timed relation to the scanning movement of the electron beams. As the electron beams form three differently colored lines on three of the phosphors, those lines are mixed together as has been discussed by member 30, to emit as a single mixed line at 40. The vertical focus of this line is changed by lens 42 to the location 43, and the mirror surfaces 51 then act to reflect the line information onto screen 45. The rotation of unit 44 and its mirror faces 51 causes successive lines of the image produced on screen 45 to be spaced apart transversely of those lines, thus optically scanning the screen in a manner cooperating with the horizontal scanning within tube 11 to produce a full image at the screen. After one picture has been completed, the next successive mirror 51 moves into a position opposite line 43, so that this next mirror commences to again scan across the screen, and produce a second successive image. The shape of the screen and the configuration of the other parts is purposely selected to cause the virtual image which is viewed by looking at screen 45 to occur at a point behind the screen at which the horizontal and vertical foci will both be coincident, to eliminate the astigmatism of the system. Preferably, the screen is a hyperbolic cylinder having its focus along the line 43.

FIG. 3 is a view similar to FIG. 1, but showing a slightly variational form of the invention, in which the tube **11*a* is somewhat changed, and a lens 30*a* is substituted for unit 30 as the light concentrating member. With regard first to tube 11*a*, this tube may be the same as tube 11 of FIG. 1, except that three relatively wide color strips 24*a*, 25*a*, and 26*a* are utilized, in association with the three electron beams 21*a*, 22*a* and 23*a* respectively. The three beams first of all may scan top lines at 124, 125 and 126 respectively on their strips 24*a*, 25*a* and 26*a*, following which each beam may be deflected downwardly a very short distance to scan a second line 224, 225 or 226** on the same color strip, with this continuing until each beam has scanned a predetermined number of lines (say seven or eight lines), on the corresponding strip. At that time, all beams return upwardly to again commence scanning across their respective phosphor strips.

The lens **30*a* is a cylindrical lens of uniform cross-section across the entire horizontal width of tube 11*a* (and strips 24*a*, 25*a* and 26*a*.) Also, this lens preferably extends through a large enough angle, about the center 53 of the viewing face of tube 11*a*, to pick up most of the light which emits from the phosphors. Lens 30*a* coacts with a second lens 42*a* to focus the three illuminated lines formed on the phosphor strips 24*a*, 25*a* and 26*a* respectively at three parallel lines 43*a*, 143*a* and 243*a* respectively, which lines are closely adjacent the mirror surfaces 51*a* of unit 44*a* (corresponding to unit 44 of FIG. 1). The three lines 43*a*, 143*a*, and 243*a* are in turn reflected by the outer surfaces 51*a* toward screen 45*a***, in much the same manner as discussed in connection with the first form of the invention to form a virtual image behind that screen.

To compensate for the fact that the three image lines **43*a*, 143*a* and 243*a* are slightly displaced from one another, I introduce delay intervals between the signals fed to the three electron guns 18*a*, 19*a* and 20*a*. For example, the signal in gun 19*a* may be delayed exactly one line relative to the signal in gun 18*a*, while the signal in gun 20*a* may be delayed another line relative to the signal in gun 19*a*. This result may be achieved by the introduction of any convenient type of delay element (116*a* and 117*a*) into color signal lines 16*a* and 17*a* such as a suitable acoustic or magnetrostrictive delay member, to appropriately delay the signals in lines 16*a* and 17*a* relative to the signal in line 15*a*. If the delay between the different guns is one line, as discussed, then the rest of the system is so designed that the offsetting of the lines 43*a*, 143*a* and 243*a* causes the mirror surfaces 51*a* to form the three colors into three successive lines on screen 45*a*** at any particular instant. In this way, the differently colored lines are properly mixed together at the screen itself, to produce a proper ultimate image.

It will be apparent that in the first form of the invention the shape of member 30 may of course be varied somewhat while still achieving the desired light guiding and concentrating function. To define the configuration of the reflective surfaces formed by walls 31 and 32, it may be stated that these surfaces should form together a cylinder, in the mathematical sense.

Figure 4:
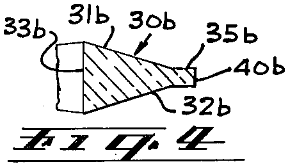

FIG. 4 represents fragmentarily a further form of the invention which may be essentially the same as that of FIG. 1 except as to the construction of light concentrator **30*b*. In FIG. 4, the concentrator takes the form of a solid body of transparent glass, resinous plastic material, or the like, having its upper and lower surfaces 31*b* and 32*b* coated with aluminum, silver or other reflective material rendering these surfaces internally specularly reflective to serve the function of walls 31 and 32 in FIG. 1. The end portions 35*b* of these reflective walls may be positioned in very closely spaced parallel relation, to form the light into a narrow line at the uncoated discharge end 40*b* of the concentrator. The light entrance side 33*b* is of course uncoated, while the sides of body 30*b* (corresponding to surfaces 36 and 37 of FIG. 2) may be either uncoated, or coated with substantially completely light absorbent material. Since the transparent material of body 30*b* has a higher index of refraction than the air within unit 30 of FIG. 1, body 30*b* may be shorter and more abruptly convergent than unit 30 while having the same equivalent length and effective rate of convergence as unit 30**.

I claim:

A color television system including self luminous screen means having different portions for producing light of a plurality of different colors, means for scanning said different portions of the screen means in accordance with different picture signals to produce lines of different colors, a lens system for receiving light of different colors from said different portions of the screen means and focusing it at predetermined locations, optical scanning means receiving the light from said lens system and projecting said light for viewing and constructed to scan optically in a direction to produce an image, said different portions of the screen means being offset from one another, and means for introducing a delay into one of said picture signals relative to another to compensate in the ultimate image for the offset relationship of said different portions of the screen means.

References Cited by the Examiner

UNITED STATES PATENTS

| | | | |
|---|---|---|---|
| 2,165,078 | 7/1939 | Toulon | 178—7.85 |
| 2,510,106 | 6/1950 | Henroteau | 178—7.85 |
| 2,598,941 | 6/1952 | Roth | 178—5.4 |
| 2,611,819 | 9/1952 | Serrell | 178 |
| 2,615,975 | 10/1952 | Sziklai | 178—5.4 |
| 2,840,632 | 6/1958 | Parker | 178—5.4 |
| 2,957,044 | 10/1960 | Calder et al. | 178—7.85 |

FOREIGN PATENTS

| | | |
|---|---|---|
| 210,490 | 1/1960 | Austria. |

DAVID G. REDINBAUGH, *Primary Examiner.*

ROBERT SEGAL, *Examiner.*

J. A. O'BRIEN, *Assistant Examiner.*